(Model.)
M. H. UNDERWOOD.
THILL COUPLING.
No. 337,895.          Patented Mar. 16, 1886.
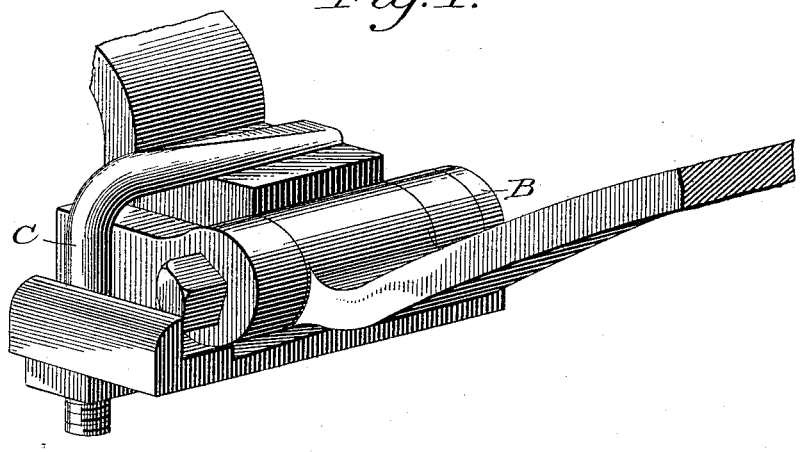
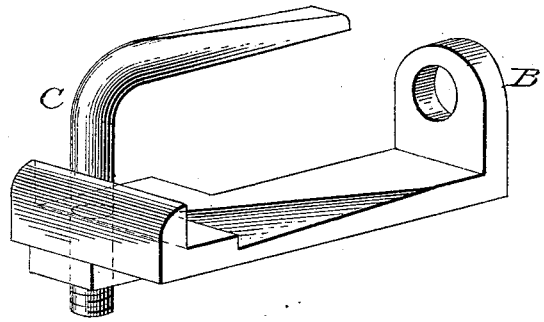

UNITED STATES PATENT OFFICE.

MARSHALL H. UNDERWOOD, OF SOUTH RILEY, ILLINOIS.

THILL-COUPLING.

SPECIFICATION forming part of Letters Patent No. 337,895, dated March 16, 1886.

Application filed January 13, 1886. Serial No. 188,451. (Model.)

*To all whom it may concern:*

Be it known that I, MARSHALL H. UNDERWOOD, a citizen of the United States, residing at South Riley, in the county of McHenry and State of Illinois, have invented a new Attachment to Thill-Couplings, to hold the coupling pin or bolt, and to force and hold the rubber or iron wedge or steel spring (used to prevent rattling) to its place; and I do hereby declare that the following is a full, clear, and exact description of the construction of the same, reference being had to the annexed drawings, making a part of this specification, in which—

Figure 1 shows the attachment applied to the coupling, and Fig. 2 shows the attachment.

B consists of a strap of iron or other suitable material, to cross underneath the coupling, and is to be turned up at each end, as shown, one end being the wider, and having a shoulder near the center for the end of the clip-yoke. The narrow end is to have a hole to receive the end of the coupling-pin after it has passed through the coupling. The other end is to raise sufficiently to rest against the face of the head of said pin to hold the same to place, and is to have a hole immediately before the turn and back of the center to receive the hook or clasp C, as hereinafter described.

C consists of a hook or clasp with a thread and burr upon its lower end, and having a sharp corner upon its lower surface, and is designed to rest in a groove upon the upper surface of the rubber or iron wedge or steel spring, (used to prevent rattling,) and is to pass downward immediately back of the head of the coupling-pin and through the strap B, as above described, and by means of the burr upon the lower side holds said strap B to place, and draws and holds the said wedge or spring to its position.

My attachment is operated as follows: After placing the thills in the shackle-irons and inserting the coupling-pin, place the anti-rattle rubber wedge to its place. Place the plate B, Fig. 2, underneath the coupling, inserting the end of the coupling-pin in the hole in small end. Raise the shoulder upon the other end to clasp the head of the said pin. Pass the hook C, Fig. 2, down through the hole in said plate and back of the head of coupling-pin, with the sharp corner of the under surface of the hook resting in the groove upon the upper face of the rubber, as shown in Fig. 1. Then put the burr on said hook, underneath the plate, and turn the same tight, thus forcing rubber to place and holding the plate B, Fig. 2, to its position. To remove the same, loosen said burr, turn hook in front of rubber, remove rubber, and the plate will drop from head of pin, which can then be removed.

I am aware that devices have been made and claimed for simply holding the coupling-pin to place without a burr by clasping head of pin, also for simply forcing rubber wedge to place without tongues by passing a small bolt through the said rubber; but I am not aware that any device has been made, claimed, or used that serves the double purpose.

I make no claim for any device for either single purpose.

What I claim, and desire to secure by Letters Patent, is—

The combination, in a thill-coupling attachment, of the plate B, Fig. 2, with its ends turned up, as shown, and the hook C, Fig. 2, with the thread and burr upon its lower end, and sharp corner upon lower surface, as shown, attached to the ordinary thill-coupling, as described, and as shown in Fig. 1, and constructed in the shape and manner described, or in any manner substantially the same which shall produce the same double results of holding the coupling-pin to place and forcing and holding the anti-rattle rubber wedge to its position.

MARSHALL H. UNDERWOOD.

Witnesses:
NEBELOW V. WOLEBEN,
HENRY UNDERWOOD.